United States Patent [19]

Ash

[11] Patent Number: 5,432,220
[45] Date of Patent: Jul. 11, 1995

[54] PROCESS FOR PRODUCING STABILIZED POLYKETONE POLYMERS AND POLYMERS PRODUCED THEREFROM

[75] Inventor: Carlton E. Ash, Sugar Land, Tex.

[73] Assignee: Shell Oil Company, Houston, Tex.

[21] Appl. No.: 106,012

[22] Filed: Aug. 13, 1993

[51] Int. Cl.⁶ ............................................. C08F 6/00
[52] U.S. Cl. ................................. 524/300; 524/612; 528/490; 528/499
[58] Field of Search ................. 524/300, 417, 612; 528/490, 499

[56] References Cited

U.S. PATENT DOCUMENTS

| | | | |
|---|---|---|---|
| 4,876,307 | 10/1989 | Allen | 524/612 |
| 4,880,865 | 11/1989 | George | 524/449 |
| 4,960,865 | 10/1990 | Blytas et al. | 528/499 |
| 5,066,701 | 11/1991 | George et al. | 524/417 |
| 5,075,422 | 12/1991 | Syrier et al. | 528/486 |
| 5,077,333 | 12/1991 | George | 524/417 |
| 5,115,003 | 5/1992 | George | 524/417 |
| 5,122,564 | 6/1992 | George | 524/417 |
| 5,122,565 | 6/1992 | George | 524/417 |
| 5,141,981 | 8/1992 | George et al. | 524/417 |

Primary Examiner—Kriellion S. Morgan

[57] ABSTRACT

It is herein disclosed a process for stabilizing freshly prepared polyketone polymer comprising the step of contacting said polymer with a stabilizing agent selected from the group consisting of acidic water and an inorganic phosphate compound in water. The inventive process results in stabilized polyketone polymers having and exhibiting improved thermal oxidative and melt stability properties.

2 Claims, No Drawings

PROCESS FOR PRODUCING STABILIZED POLYKETONE POLYMERS AND POLYMERS PRODUCED THEREFROM

FIELD OF THE INVENTION

This invention generally relates to polyketone polymers. More particularly, this invention relates to stabilized polyketone polymers, and to a novel process for producing such stabilized polymers.

BACKGROUND OF THE INVENTION

Polymers of carbon monoxide and olefins generally referred to as polyketones are well known in the art. Of particular interest among polyketone polymers, is the class of linear alternating polymers of carbon monoxide and at least one ethylenically unsaturated hydrocarbon. This class of polymers is disclosed in numerous U.S. patents assigned to Shell Oil Company, exemplified by U.S. Pat. No. 4,880,865 which is herein incorporated by reference.

Although the properties of polyketone polymers are suitable for many applications, linear alternating polymers of carbon monoxide and at least one ethylenically unsaturated hydrocarbon do exhibit a deterioration of physical properties upon thermal oxidative degradation. This degradation is due to a chemical attack of atmospheric oxygen on the polymer chains and is characteristic of most, if not all organic polymers. Oxidation is typically autocatalytic and occurs as a function of heat and oxygen, hence the term thermal oxidative degradation. It is desirable to inhibit the deterioration of polymer properties by stabilizing the polymer toward the adverse effects of heat and oxygen. There are a large number of thermal oxidative stabilizers which are employed commercially to stabilize thermoplastic polymers against such degradation. However, many of the thermal stabilizers which are known to be effective with polyolefins, polyamides, polyacetals, polyacrylates, etc. are only marginally or not at all effective when employed with polyketone polymers. It would therefore be of advantage to provide polyketone polymers which demonstrate improved heat stability to extend their use in higher temperature applications.

It is known that upon synthesis polyketone polymers contain a variety of impurities. These impurities include residual solvents such as methanol, ketal defects, residual catalyst components, and metal ions. The presence of these impurities is believed to adversely affect the stability of the polymer, and it is believed that their removal or reduction will enhance the stability of the polymer. Consequently, the discovery of methods and techniques for the removal of these impurities are desirable, and will be beneficial to the art and the industry.

SUMMARY OF THE INVENTION

It is a general object of this invention to provide a stabilized polyketone polymer.

It is a particular object of this invention to produce a melt stabilized polyketone polymer.

It is a further object of this invention to produce an oxidatively stable polyketone polymer.

It is also an object of this invention to provide a process for producing a melt stabilized and oxidatively stabilized polyketone polymer.

Accordingly, it is now provided a method for producing a melt and oxidatively stabilized polyketone polymer, comprising contacting freshly produced polyketone polymer with a sufficient amount of a stabilizing agent selected from the group consisting of acidic water and an inorganic phosphate compound in water.

DETAILED DESCRIPTION OF THE INVENTION

The materials useful in practicing this invention include a linear alternating polymer of carbon monoxide and at least one ethylenically unsaturated hydrocarbon (simply referred to as a polyketone polymer) water, acids, and inorganic phosphate compounds. In general, the practice of this invention involves suitably contacting sufficient quantities of the useful material to form a stabilized polyketone polymer composition.

During melt processing, the neat polyketone polymer exhibits an undesirable viscosity increase. It is most desirable for a thermoplastic polymer to have little or no viscosity increase during processing. Most commercial-grade engineering thermoplastics exhibit little or no change in viscosity during melt processing because of the presence of an additive package selected to minimize such a change in properties. This invention stabilizes the polyketone polymers so that they remain substantially unchanged upon being subject to conditions which would otherwise bring about a change in their properties.

Thermal oxidative degradation of organic polymers relates to the deterioration of polymer properties due to the chemical reaction(s) between the polymer and atmospheric oxygen. While oxidation processes are complicated and mechanistic pathways of oxidation between different polymers may vary, oxidation is generally promoted by heat, often initiated by trace impurities such as metal ions or organic prodegradants, and characterized overall as autocatalytic in which carbon radicals and peroxyl radicals constitute key intermediates in the catalytic cycles. Consumption of oxygen by the polymer propagates the catalytic cycle and generates oxygenated species which either comprise part of the polymer or are evolved as gaseous products. These oxygenated species may further be prodegradative to the polymer. For example, hydroperoxides are not inherently stable and are capable of decomposing into new radicals, either thermally or catalyzed by trace impurities, which can then initiate additional oxidative cycles.

For polyketones it is believed that the thermal oxidative process involves the formation of oxygenates which under aging conditions cleave polymer chains and result in a reduction of molecular weight and a loss of polymer entanglement. Ultimately this results in a deterioration of polymer mechanical properties such as reduced impact strength, loss of elongation at break, and embrittlement. It would therefore be advantageous to stabilize the polyketone polymers towards these property losses either by reducing their overall rate of oxidation or reducing their rate of polymer chain scission.

This object is accomplished by washing and/or contacting impure polyketone polymer with a stabilizing agent selected from the group consisting of acidic water, and a sufficient amount of inorganic phosphate compound in water. The washing and contacting the unstabilized polyketone polymer in the manner previously disclosed results in a stabilized polymer.

The polymer of the invention, the purifying agents, conventional agents typically useful in the formulation of the inventive composition, and a process for producing the stabilized polyketone polymer of the invention are discussed in more details in various sections of this specification.

The polyketone polymers which are employed as the major component of the melt stabilized polymer composition of the invention are of a linear alternating structure and contain substantially one molecule of carbon monoxide for each molecule of unsaturated hydrocarbon. Suitable ethylenically unsaturated hydrocarbons for use as precursors of the polyketone polymers have up to 20 carbon atoms inclusive, preferably up to 10 carbon atoms, and are aliphatic such as ethylene and other α-olefins including propylene, 1-butene, isobutylene, 1-hexane, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-iospropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

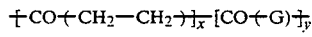

where G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the compositions of the invention, there will be no second hydrocarbon present and the copolymers are represented by the above formula wherein y is zero. When y is other than zero, i.e. terpolymers are employed, the —CO—(—CH₂—H₂—)— units and the —CO—(—G—)— units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chains as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer, and in the case of terpolymers the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,834,144 (van Broekhoven et al). The carbon monoxide and hydrocarbon monomers are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]propane.

The polymerization to produce the polyketone polymer is conducted in an inert reaction diluent, preferably an alcoholic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

The purifying agents useful in the practice of this invention include water, acids and acidic material, and inorganic phosphate compounds. The useful water can be obtained from any available source, but is preferably purified water or water with a high degree of purity. Such purified water is commercially available, and is exemplified by Omnisolve ® sold by E. M. Science.

Useful acids are typically Bronsted Acids which include sulfuric acid, boric acid, nitric acid, and carboxylic acids. Weak acids such as acetic acid, are preferred.

Useful inorganic phosphate compounds include lanthanum phosphates, aluminum phosphates, magnesium phosphates, zirconium phosphate, barium phospate, and calcium phosphates. The preferred inorganic phosphates are the tribasic phosphates, sometimes referred to as hydroxyapatite.

The hydroxyapatites can be represented by the general formula $M_{10}(PO_4)_6(OH)_2$, where M is barium (Ba), strontium (Sr), or calcium (Ca). The preferred hydroxyapatite is calcium hydroxyapatite, $Ca_{10}(PO_4)_6(OH)_2$, a naturally occurring calcium phosphate and the major constituent of bone and tooth mineral. It is a finely divided crystalline, material rich in surface ions which are readily replaced by fluoride ions. Calcium hydroxyapatite is also referred to as tribasic calcium phosphate.

Broadly speaking, the process of the invention involves contacting in a suitable device, such as a vessel, freshly prepared polyketone polymer, preferably in powder form, with a sufficient amount of acidic water to form a heterogeneous mixture. By sufficient amount of acidic water is meant a quantity that is enough to substantially dilute the impurities present in the polymer. In numerical terms, a weight ratio of at least 3:1 of acidic water to polymer is believed to satisfy this requirement. Alternatively, the freshly prepared polyketone polymer is contacted in a suitable device with a sufficient amount of an inorganic phosphate compound in water. Following this, the vessel is closed and degassed with an inert gas such as nitrogen. Subsequent to this, the vessel is heated while stirring at a temperature of from about 60°–200° C., preferably at a temperature which is not above the melting point of the polymer. The numerical preferred temperature is from about 125° to 175° C. The heating is carried on for a period of time sufficient for the acidic water to thoroughly wet the polymer which is in turn dependent on the operating temperature. After the heating, the now stabilized polyketone polymer is rinsed and dried using conventional methods and devices, and is tested according to the procedures disclosed in U.S. Pat. No. 4,988,754.

As will be seen from the examples and data table disclosed herein, freshly prepared polyketone polymers treated according to the methods of this invention have and exhibit improved stability, particularly improved thermal oxidative and melt stability.

The following examples and table further illustrate the various aspects of the invention.

EXAMPLE 1

A linear alternating terpolymer of carbon monoxide, ethylene, and propylene (91/054) was produced in the presence of a catalyst composition formed from palladium acetate, trifluoroacetic acid and 1,3-bis[ei(2-methoxyphenyl)phosphino]propane. The polyketone polymer powder had a melting point of about 220° C. and an LVN of about 1.65 dL/g when measured in m-cresol at 60° C. The polyketone polymer also contained 0.5% Irganox 1330 and 0.5% Nucrel 535.

EXAMPLE 2

A 25.0 g portion of the polymer in Example 1 was submitted to an aqueous post-treatment by charging it with 2.0 of a divalent metal salt (Zn, Mg, or Ca acetate) and 200 mL of high purity water (HPLC grade, OmniSolve® by EM Science) to a 300 mL, 316-SS Parr autoclave equipped with a turbine stirrer, a gas inlet port, a gas outlet port, and a thermocouple well. This charge was carried out in a nitrogen filled glove bag to minimize oxygen exposure. After closing the autoclave, it was attached to a temperature controller and electric heat mantle. While stirring at 100 rpm, four argon pressure/vent cycles (about 120 psig) were carried out to further degas the vessel and contents. Heat was applied such that the temperature was raised at a rate of about 7° C./min to a final temperature of 150°±2° C. After 15 minutes at this temperature under autogenous water vapor pressure, the reactor was cooled while stirring. Once cooled, the autoclave was opened in a nitrogen filled glove box and the contents were removed and filtered. The resultant powder was further rinsed with 200 mL of high purity water and again rinsed. Nitrogen purge was left over the powder for approximately 4 hours after which time the powder was subjected to further drying at 50° C. in vacuo with a $N_2$ purge for about 16 hours. This procedure provided a polymer which contained some level of metal salt deposits. The procedure outlined above was carried out in duplicate such that approximately 50g of final powder product was obtained and blended. The 50g of blended polymer was then melt pelletized at melt temperatures of approximately 250° C. using a Baker Perkins 15 mm twin screw extruder with melt temperatures of approximately 250° C. The pellets were then further dried and finally compression molded into a 30 mil sheet. From this sheet, melt rheology and oven aging specimens were obtained. Melt viscosity of each sample was determined over time in the melt in a Rheometrics parallel plate rheometer operated at 275° C. Oven aging results were obtained by monitoring the time to embrittlement for 1 cm wide specimens in Blue M forced air ovens.

EXAMPLE 3

A 25.0 g portion of the polymer in Example 1 was subjected to the same post-treatment as described in Example 2 with the exception that no metal salts were used, i.e. the polymer was heated to 150° C. with only high purity water.

EXAMPLE 4

A 25.0 g portion of the polymer in Example 1 was subjected to a similar post-treatment as described in Example 2 with the exception that 0.45 g glacial acetic acid (0.04 M) was part of the reactor charge instead of a metal salt. Once the reactor contents were filtered, the powder was returned to the autoclave with another 200 mL portion of high purity water and reheated to 150° C. This was done to ensure that all of the acetic acid was thoroughly removed from the powder. After this treatment, the polymer was recovered and tested as described in Example 2.

EXAMPLE 5

A 25.0 g portion of the polymer in Example 1 was subjected to the same post-treatment described in Example 4 with the exception that the concentration of acetic acid was increased to 1.35 g (0.12 M) and the soak temperature was 165° C. rather than 150° C.

EXAMPLE 6

A 25.0 g portion of the polymer in Example 1 was subjected to the same post-treatment described in Example 2 with the exception that 0.06 g of calcium hydroxyapatite (Budenheim C13/09, Ca/P ratio of 1.67) was part of the reactor charge instead of a metal acetate. Calcium hydroxyapatite was not appreciably soluble in water, therefore, after workup it was present in the polymer in a concentration of about 0.24 wt %. For comparison purpose, a separate sample was prepared in which the same amount of calcium hydroxyapatite was placed on the terpolymer powder with only dry blending, i.e. no autoclave treatment was carried out on this sample to determine if the addition with water was beneficial.

TABLE 1

| Example | Autoclave Treatment | Crossover[1] Time (min.) | Gel Time[2] (min.) | Viscosity (Pa.-sec.) @10 min. | (Pa.-sec.) @28 min. | Embrittlement Oven Aging (days) 100° C. | 125° C. |
|---|---|---|---|---|---|---|---|
| 1 Control | None | 9 | 16 | 2154 | 8614 | 68 | 14 |
| 2(a) | $Zn(OAc)_2$ | 6 | 12 | 4372 | 48390 | 28 | 7 |
| 2(b) | $Mg(OAc)_2$ | <2 | | 81790 | 129500 | 13 | 5 |
| 2(c) | $Ca(OAc)_2$ | 2 | 6 | 7554 | 32270 | 26 | 7 |
| 3 | $H_2O$ | 16 | 31 | 1484 | 5278 | 95 | 19 |
| 4 | Acetic acid (0.04M) | 11 | 18 | 2571 | 10310 | 90 | 20 |
| 5 | Acetic Acid* (0.12M) | 11 | 16 | 2629 | 10850 | 109 | 23 |
| 6(a) | $H_2O$/CaHAp | 14 | 26 | 2885 | 8001 | 123 | 27 |
| 6(b) | CaHAp** | 18 | 36 | 2159 | 5973 | | 23 |

*Temperature of treatment was 165° C.
**Dry blending of additive with polymer with no autoclave treatment.
[1]Crossover time is defined as the time in which the storage modulus (G') and the loss modulus (G") become equal while operating at a frequency of 1 rad/sec.
[2]Gel time is defined as the time at which the loss factor (G"/G') is independent of angular frequency.

Examples 2(a-c) show the effect which metal ions have on the melt and long term heat stability of polyketone polymers. The metal ions promote rapid melt degradation as evidenced by a reduction in crossover time and gel time and a greater increase of melt viscosity with time compared to Example 1. The metal ions also increase thermal-oxidative degradation as evidenced by a reduced number of days to embrittlement compared to the control.

Example 3 shows that an elevated temperature water treatment of polyketone polymer benefits both the melt and thermal-oxidative stability of the polymer. Examples 4 and 5 which utilize aqueous acetic acid show even further improvements in the thermal-oxidative stability of the polymer with the largest improvement seen in Example 5 utilizing the higher concentration of acid and higher temperature.

Example 6 shows that calcium hydroxyapatite as an additive improves both the melt and thermal-oxidative stability of polyketones, however, the benefit to heat aging is most pronounced when the additive is introduced to the polymer with an elevated temperature water treatment. In fact, example 6(a) shows that this procedure results in a polymer with almost twice the time to embrittlement compared to the control in Example 1.

While this invention has been described in detail for the purpose of illustration, it is not to be construed as limited thereby but is intended to cover all changes and modifications within the spirit and scope thereof.

What is claimed is:

1. A process for stabilizing freshly prepared polyketone polymer comprising contacting said polymer with a sufficient amount of acidic water substantially free of metal ions to form a stabilized polymer and separating said acidic water from said stabilized polymer wherein the acid component of said acidic water is acetic acid.

2. A process for stabilizing fleshly prepared polyketone polymer comprising contacting said polymer with a stabilizing agent selected from the group consisting of acidic water substantially free of metal ions and an inorganic phosphate compound in water wherein the acid component of said acidic water is acetic acid.

* * * * *